United States Patent [19]

Hacker

[11] 4,303,450

[45] Dec. 1, 1981

[54] SPRAYABLE INSULATION COMPOSITION

[75] Inventor: Dennis J. Hacker, Albuquerque, N. Mex.

[73] Assignee: High Efficiency Insulation Technologies, Inc., Albuquerque, N. Mex.

[21] Appl. No.: 151,799

[22] Filed: May 21, 1980

[51] Int. Cl.³ .............................................. C04B 21/00
[52] U.S. Cl. ..................................... 106/88; 106/90; 106/98; 106/99
[58] Field of Search ............... 106/88, 90, 98, DIG. 2, 106/99, 120

[56] References Cited

U.S. PATENT DOCUMENTS

| | | | |
|---|---|---|---|
| 2,585,366 | 2/1952 | Bollaert et al. | 106/98 |
| 2,698,251 | 12/1954 | Shea et al. | 106/98 |
| 2,770,560 | 11/1956 | Hobson | 106/88 |
| 2,993,016 | 7/1961 | Sucetti | 106/88 |
| 3,660,046 | 12/1967 | Johnson et al. | 106/98 |

FOREIGN PATENT DOCUMENTS 2636482  2/1977  Fed. Rep. of Germany ... 106/DIG. 2

*Primary Examiner*—James Poer
*Attorney, Agent, or Firm*—Frank P. Cyr

[57] ABSTRACT

A sprayable insulation composition curable at ambient conditions consisting essentially of:

(a) a dry mix of 100–120 parts by volume of expanded perlite, 20–30 parts by volume of Portland cement, 0.5–2.0 parts by volume of hydrated lime and 0.1 part by volume of diatomite admixed with (b) an aqueous solution of 0.25–2 ounces per Imperial gallon of water-soluble foaming agent, at a level of 20–26 pounds of dry mix per one Imperial gallon of solution.

10 Claims, No Drawings

SPRAYABLE INSULATION COMPOSITION

BACKGROUND OF THE INVENTION

Most sprayed insulation materials are based upon petrochemical products and therefore are restricted in their use by the possibility of degrading by flame or heat with a subsequent toxic and/or fire spread hazard.

The usual methods to overcome these fire hazard risks in insulation is to use a dry board insulation material such as vermiculite or gypsum. These have the disadvantage of both being subject to water absorption and a tendency to expand, increase drag weight and pull away in humid or extreme weather conditions. Plus, such a dry panel has to be cut to shape to encase angles, etc. Also, dry insulation panels are restricted by the very nature of their base structures to interior use.

My present invention overcomes the foregoing disadvantages by allowing on-site use of cold state, pre-expand perlite particles (loose form) to be premixed in a cold state, passed to a spray gun nozzle, without fracture or breakdown of the natural geodetic strength or known insulation qualities of expanded perlite particles whereby a coating of any predetermined thickness up to an immediate 2 inches can be applied to any substrate capable to receive it, following any angles or contours of said substrate with a uniformity of desired thickness of coating. This coating will provide the predetermined insulation requirements plus having the abilities to act as a fire barrier that will not degrade or emit toxics at temperatures in excess of 1700° F. for periods of time that are predetermined by the initial insulation thickness.

The insulation as described herein would have no need of exothermics to cure apart from an ambient temperature in excess of 40° F.

Also, by the nature of the aggregate, i.e. expanded perlite particles, the material would be abundant and the cost would be inexpensive.

This invention relates to a cold mixable, sprayable and cold curable, noncombustible, nontoxic material that is useful as an insulation and as a fire, acoustic and weather barrier onto any substrate that is capable to receive said material, plus pressure feeding pre-expanded perlite particles without destroying the geodetic structure and strength of said particles and known insulation qualities of cold state perlite. The material can also be used to fill confined spaces such as wall cavities, attics and hollow partitions in the construction industries. Also, it can be used as fire, acoustic and insulation barriers when used for vehicles, ships, transporters and any other form of container that has need of thermal insulation at high and low temperatures.

Sprayed or foamed-in-place insulation materials presently in use generally are derived from petrochemical products, either as a source of the basic material mass or as a source of bonding or adhesive agents thereafter. These materials are not only becoming increasingly expensive and difficult to obtain, but also can, by virtue of their combustibility, become fire hazards and also give rise to toxic and lethal fumes and smoke when used in buildings or other confined areas. Petrochemical products used as external insulation can degrade from exposure to extreme weather conditions and solar radiation. Accordingly, lamination or coating to provide a barrier against weathering may be required.

Johnson et al, in U.S. Pat. No. 3,360,046 disclose a cement composition, containing silica flour and vermiculite or perlite, which can be pumped into wells to insulate boreholes used for secondary and tertiary recovery of oil. This material is cured by heating at about 100° F. at 100% relative humidity for 24 hours. It is apparent that this curing cycle would be unacceptable for use in confined spaces in the building trades.

Bollaert et al (U.S. Pat. No. 2,585,366) describe a lightweight concrete mixture containing Portland cement, cellular perlite and filler-grade finely comminuted silica, such as distomaceous earth. Bollaert et al view silica of very small particle size, of the order of 70% finer than 10 microns, as critical in decreasing the tendency of Portland cement and perlite to separate and in producing a product having strength close to that of concrete based on heavy aggregate.

Shea, Jr. et al (U.S. Pat. No. 2,698,251) teach manufacture of lightweight siliceous insulation material in which a particulate siliceous filler is pretreated to produce a reactive silica coating on the particles, which are combined with an alkaline earth metal binder and generally heated above 80°–100° C. to obtain a cured product.

Sucetti, in U.S. Pat. No. 2,993,016, discloses a dry plaster mix containing aggregate, clay, water-soluble cellulose derivative and aminoplast resin. The mix can be combined with water to yield a material which is sprayable and which hardens in a few hours, apparently because of reaction between the cellulose derivative and aminoplast.

OBJECT OF THE INVENTION

It is the object of the invention to provide a premixed composition containing expanded perlite particles which can be mixed with water to form a cold mastic or paste. The resulting paste or mastic can be sprayed on a surface being insulated without destroying the cellular structure or insulating properties of expanded perlite and, in a reasonable time, sets to a dry, rigid material which has excellent insulating qualities, at high or low temperatures.

SUMMARY OF THE INVENTION

In a compositional aspect, this invention relates to a sprayable insulation composition curable at ambient conditions consisting essentially of:

(a) a dry mix of 100-120 parts by volume of expanded perlite, 20-30 parts by volume of Portland cement, 0.5-2.0 parts by volume of hydrated lime and 0.1-1.0 part by volume diatomite admixed with (b) an aqueous solution of 0.25-2 ounce per gallon of water soluble foaming agent at a level of 20-26 pounds of dry mix per Imperial gallon of solution.

In a method-of-use aspect, this invention provides a method of applying insulating material to a confined area or building structure by spraying into the area to which insulation is being applied the foregoing composition, at a pressure of 30-50 psi.

Preferably, "Portland cement," as used in the specification and claims, is a mixture of Ca, Si, Al, Fe and Mg, generally corresponding to calcium silicate, $3CaO.SiO_2$; dicalcium silicate, $2CaO.SiO_2$; tricalcium aluminate, $3CaO.Al_2O_3$; tetracalcium-aluminaferrite, $4CaO.Al_2O_3.Fe_2O_3$ and calcium sulfate, $CaSO_4$. It will be understood that the composition of Portland cement can be varied over a fairly wide range. However, the Portland cement contemplated for use in accordance with the invention will comprise about 75% of calcium silicates, 5-10% of calcium aluminates, 5% of CaSO₄, less than 1% of sodium or potassium oxides, 2-9% of M$_g$O and 5-10% of calcium-aluminate-iron compounds, the foregoing percentages being by weight.

The Portland cements used for the compositions of the invention generally have a density of 50-55 lbs/ft³. Therefore, "20-30 parts" by volume corresponds to about 3-5 parts by weight. "Expanded perlite" as used in the specification and claims, will have a bulk density of 5-15 lbs/ft³ and a particle size of 4-100 mesh (Tyler) (4-7 mm). Preferably, the perlite will have a density of 6-15 lb/ft³ and a particle size of 3,500-5,500 microns. Accordingly, "100-120 parts by volume" is equivalent to 20-25 ounces of expanded perlite having a density of 5-15 lb/ft³ and to 25 ounces of expanded perlite having a density of 8-9 lb/ft³.

It will be appreciated that expanded perlite refers to products of expansion and vesiculation of perlitic minerals, which are volcanic glasses among which are included perlite, vitrophore, pitchstone and some kinds of obsidian. The expanded perlite is obtained by crushing the mineral to a preselected particle size and heating the crushed materials at 1700°-2000° F. to produce plastic mineral material, from which combined water is expelled to yield a vesicular material of considerably greater volume than before expansion.

"Hydrated lime," as used in the specification and claims, means CaO.H₂O. This material has a density of 29.4 lb/ft³ so that 0.5-2 parts by volume are equivalent to 1 ounce parts by weight.

"Diatomite," as used in the specification and claims, means diatomaceous earth. This material is siliceous and consists of skeletons of diatoms or small marine animals. The material used in the practice of the invention will have a density of 8-10 lb/ft³, corresponding to a particle size of 3500-5500 microns. Therefore, "0.1-1.0 part by volume" of diatomite corresponds to 2.5 parts by weight. Preferably, the density of the diatomite used is 8-10 lb/ft³ and the particle size is 3500-5500 microns, which corrsponds to 2-5 parts by weight of diatomite.

The compositions of the invention are made by combining the dry ingredients and blending the selected amount of dry mix with the aqueous solution of water-soluble foaming agent. The mixing can conveniently be done with a rotating mechanical paddle in a drum or container rotating in the opposite direction. Mixing is continued until the product becomes pastelike in consistency which generally requires 2-3 minutes.

The sprayable mixture thus obtained can be sprayed from a screw pump-fed sprayer at an air pressure of 30-50 psi. An air pressure of 35-45 psi is preferred. Sprayers suitable for the compositions of the invention are available commercially, for example, a "Muller R-Tex" Mono Pump using the largest size feed screw to ensure that the geodetic structure of the expanded perlite particles are not crushed whilst being fed to the gun nozzle.

The diameter of the spray nozzle can be varied from 3/16-9/16 inch, but a nozzle diameter of 5/16 inch is generally acceptable. It will be understood that aeration of the composition occurs along with propulsion of the mixture onto a substrate or into a confined space in a static structure or building.

The shelf life of the pastelike material obtained from dry mix and aqueous solution containing foaming agent is 1 year, beyond which the material becomes too dense for spraying. It is, therefore, preferred that the material be prepared at the site of use and applied within 1 hour of mixing.

It is recommended that the nozzle of the spray gun be held 8-18 inches from the surface being covered. It will be understood that thick coatings can be obtained by multiple applications of the compositions of this invention, preferably with an interval of ½-2 hours between applications.

Preferably, the dry mix used in accordance with the invention consists essentially of 105-115 parts by volume of expanded perlite, 20-30 parts by volume of Portland cement, 0.5-1.5 parts by volume of hydrated lime and 0.25-0.75 part by volume of diatomite.

In making the sprayable compositions of the invention, the dry mix is combined with an aqueous solution of water-soluble foaming agent at a level of 20-26 pounds of dry mix per gallon of solution. The preferred ratio is 20-21 pounds of dry mix per Imperial gallon of solution.

The water-soluble foaming agent or air-entraining agent is of the anionic type, of which alkanol sulfates and alkyl or aryl sulfonates are exemplary. Alkanol sulfates include compounds of the formula ROSO₃M, wherein R is a straight or branched chain alkyl of 8-30 carbon atoms and M is sodium or potassium. An exemplary compound is sodium lauryl sulfate.

Alkyl and aryl sulfonates include sodium and potassium salts of sulfonic acids derived from alkanes, alkenes and aromatic hydrocarbons including alkylated aromatic hydrocarbons. Exemplary sulfonates are sodium/potassium hexadecyl sulfonate, benzyl sulfonate, phenyl sulfonate, naphthyl sulfonate and alkylarylsulfonates of the formula R—Ar—SO₃M in which R is alkyl of 3-25 carbon atoms, aryl is phenylene or naphthylene with R and SO₃M at any ring position and M is Na or K. Preferred foaming agents are of the R—Ar—SO₃M type, that is, alkylaryl sulfonates. Most preferred are sodium alkylbenzenesulfonates derived from alkylbenzenes of 8-12 carbon atoms in the alkyl chain, e.g., nonylphenylsulfonates or dodecylbenzenesulfonates.

The amount of foaming agent is preferably 0.5-1.5 ounces per gallon of solution. When the mixture is to be sprayed on a surface, the preferred level is 0.5-1.0 ounce per gallon. If the mixture is to be sprayed into a confined area, e.g. between structural partitions, higher levels of 1.0-1.5 ounces per gallon are preferred.

Compositions thus sprayed into cavities or onto surfaces will generally set up within ½-1 hour at ambient conditions (that is, become bonded to the inner surfaces of said cavities). Complete curing at ambient conditions requires 12-16 hours depending upon the composition of substrate surfaces, at which point the product has the following characteristics: a rigid, hard-set material that is bonded and joined to any surface that it touches. After a further 20 hours, any attempt to remove the material will result in the destruction of the substrate.

When a thick coating of the composition of the invention is to be applied, addition of up to 2.5 parts by volume (5-10 grams parts by weight) of bentonite decreases the tendency of the uncured composition to delaminate from the surface being coated. The bentonite is preferably added to the dry-mix component prior to combination with the aqueous solution of foaming agent.

The ultimate strength of the cured composition of this invention can be improved by inclusion of up to 5 parts by volume of glass fiber or mineral wool in the dry mix. The fibers will generally be ¼-1½ inches in length, preferably ¾ inch and have a density of 1¼ lb/ft³. The mineral wool should have the following properties: free from oils or grease and dry-faced. Contemplated equivalents of fiberglass and mineral wool are sawdust, wood chips and paper shavings, provided that their density is 2–5 lb/ft³ and particle size is 2000–3500 microns, preferably 2500 microns.

DESCRIPTION OF PREFERRED EMBODIMENTS

In a most preferred aspect, the compositions of this invention are those wherein the dry mix contains 105–115 parts by volume of expanded perlite, 20–30 parts by volume of Portland cement, 0.5–1.5 parts by volume of hydrated lime and 0.25–0.75 part by volume of diatomite; the aqueous solution contains 0.5–1.5 ounces per gallon of alkylaryl sulfonate foaming agent, and the level of dry mix is 20–21 pounds per gallon of solution.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

EXAMPLE 1

Dry mix was obtained by blending the following ingredients:

|  | Parts by Volume | Parts by Weight |
| --- | --- | --- |
| Expanded perlite particles | 109 | 20 ounces |
| Portland cement | 24 | 56 ounces |
| Diatomite | 0.50 | 3–4 grams |
| Hydrated lime | 1 | 1 ounce |

The blend was stored in moisture-proof bags prior to use. The dry mix, at time of use, was mixed by a rotating mixing mechanical paddle in a drum or container rotating in the opposite direction with an aqueous solution of 0.75 ounce per gallon of an air-entraining agent (sodium alkylbenzenesulfonates). The amount of dry mix was 22 pounds and the amount of solution was 10 pounds. The composition was made by adding dry mix in portions to the solution and mixing until a paste the consistency of thick gruel was obtained. The resulting paste was fed to a screw-fed pump and pressure fed to an air nozzle at a pressure of 40 psi at the point of ejection and mixing through an orifice of 5/16 inch diameter. The mixture was aerated and carried to the surface being covered, the spray gun being held at a distance of from 8–18 inches from the surface.

The sprayed covering set up within 1 hour and was completely cured overnight at ambient conditions.

EXAMPLE 2

A wet paste adapted for application to a confined space, such as a wall cavity or partition, was made as in Example 1, except that the level of sodium alkylbenzenesulfonates was 1.6 ounces per gallon.

The same procedure was used as in Example 1, except that the nozzle of the spray apparatus was placed inside the cavity being filled and withdrawn gradually as the foamed material being applied was pushed back behind the nozzle. The material thus filling the cavity set up in ½–1 hour and reached a complete cure in 36 hours.

The confined space was insulated and structurally strengthened. In addition, the composition acted as a fire barrier and prevented the space from acting as a flue or chimney for fire or flames or toxic smoke.

EXAMPLE 3

A coating suitable for direct application by spraying without risk of the uncured composition delaminating from the coated surface is made by adding 2.25 parts by volume (5–10 grams parts by weight) of bentonite to the dry mix of Example 1. In this way, a coating build-up of 2 inches can be achieved. The thus-applied coating will remain stable until cured. Bentonite suitable for this purpose can be bought from any wholesale industrial outlet.

EXAMPLE 4

Compositions of Example 1 can include 0.5–4.0 parts by volume (0.675–5.4 ounces parts by weight) of a fibrous filler, e.g., glass fiber averaging ¾ inch in length and having a density of 3 lb/ft³ (1.28 kg). Cured compositions containing fiberglass are stronger than the compositions of Example 1.

EXAMPLE 5

A coating by the means and method as described in Example 1 was applied to a structural steel member following and covering the steel contours to a 1¼ inches thickness to evaluate the insulative qualities of the coating as a protective membrane for structural steel fire protection.

The structural steel member was W10×49 section 30 inches (3.762 m) long and was submitted to ASTM Designation E119-73 Standard Fire Test of Building and Construction Materials.

The coating was subjected to fire exposure for 3 hours, and the maximum allowable individual thermocouple temperature was reached at 2 hours 52 minutes.

After the test the coating was still adhering to the steel member.

Further tests have shown that an increase of coating thickness will substantially increase the fire protection time given to structural steel, or any other area of fire hazard or risk.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A sprayable insulating composition completely curable within 36 hours at ambient conditions consisting essentially of:
   (a) a dry mix of 100–120 parts by volume of expanded perlite, 20–30 parts by volume of Portland cement, 0.5–2.0 parts by volume of hydrated lime and 0.1–1.0 part by volume diatomite admixed with
   (b) an aqueous solution of 0.25–2 ounces per gallon of water-soluble foaming agent at a level of 20–26 pounds of dry mix per Imperial gallon of solution.

2. The composition of claim 1, wherein the dry mix contains 105-115 parts by volume of expanded perlite, 20-30 parts by volume of Portland cement, 0.5-1.5 parts by volume of hydrated lime and 0.25-0.75 part by volume of diatomite.

3. The composition of claim 1, wherein the aqueous solution contains 0.5-1.5 ounces per Imperial gallon of water-soluble forming agent.

4. The composition of claim 1, wherein the water-soluble foaming agent is an alkylaryl sulfonate.

5. The composition of claim 1, wherein the level of dry mix is 20-26 pounds per Imperial gallon of solution.

6. The composition of claim 1, wherein the dry mix further contains up to 2.5 parts by volume of bentonite.

7. The composition of claim 1, wherein the dry mix contains up to 5 parts by volume of glass fiber or mineral wool.

8. The composition of claim 1, wherein the dry mix contains 105-115 parts by volume of expanded perlite, 24-26 parts by volume of Portland cement, 0.5-1.5 parts by volume of hydrated lime and 0.25-0.75 part by volume of diatomite; the aqueous solution contains 0.5-1.5 ounces per gallon of alkylaryl sulfonate foaming agent and the level of dry mix is 20-26 pounds per Imperial gallon of solution.

9. A method of applying insulation material to a confined area or building structure consisting of spraying into the confined area of building structure, at a pressure of 30-50 psi, a composition of claim 1.

10. A method of applying insulation material to a confined area or building structure consisting of spraying into the confined area or building structure, at a pressure of 30-50 psi, a composition of claim 8.

* * * * *